(12) United States Patent
Sawada et al.

(10) Patent No.: US 12,448,181 B2
(45) Date of Patent: Oct. 21, 2025

(54) RECEPTACLE CAP

(71) Applicant: TOYOTA JIDOSHA KABUSHIKI KAISHA, Toyota (JP)

(72) Inventors: Yutaka Sawada, Nagakute (JP); Shota Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 18/416,290

(22) Filed: Jan. 18, 2024

(65) Prior Publication Data

US 2024/0270454 A1  Aug. 15, 2024

(30) Foreign Application Priority Data

Feb. 14, 2023 (JP) .................. 2023-021075

(51) Int. Cl.
*B65D 47/12* (2006.01)

(52) U.S. Cl.
CPC .................. *B65D 47/12* (2013.01)

(58) Field of Classification Search
CPC ........ B65D 47/12; B65D 90/34; B65D 90/52; B65D 2543/00564; B65D 2585/6882; B65D 85/307; B60K 15/0406
See application file for complete search history.

(56) References Cited

U.S. PATENT DOCUMENTS

| | | | | |
|---|---|---|---|---|
| 5,167,340 A | * | 12/1992 | Shaw | B60K 15/0406 220/295 |
| 6,357,618 B1 | * | 3/2002 | Kloess | B60K 15/03177 220/86.1 |
| 6,508,374 B1 | * | 1/2003 | Griffin | B60K 15/0406 220/288 |
| 7,290,673 B2 | * | 11/2007 | Hagano | B60K 15/0406 220/288 |
| 7,954,660 B2 | * | 6/2011 | Fishman | B60K 15/0406 220/304 |
| 2018/0186231 A1 | * | 7/2018 | Nagasawa | B60K 15/0406 |
| 2019/0217697 A1 | | 7/2019 | Ozawa | |

FOREIGN PATENT DOCUMENTS

JP   2018168890 A   11/2018
JP   2019123375 A   7/2019

* cited by examiner

*Primary Examiner* — Kareen K Thomas
(74) *Attorney, Agent, or Firm* — Hunton Andrews Kurth LLP

(57) ABSTRACT

Provided is a receptacle cap with a simple structure capable of preventing fixation of a receptacle and a filling nozzle. A receptacle cap is configured to be removably attached to a receptacle that connects to a fuel gas filling nozzle. The cap includes a top panel portion that blocks an opening of the receptacle, a skirt portion extending along an outer peripheral wall of the receptacle, and a liquid absorbing portion provided at least on an inner peripheral wall of the skirt portion. The liquid absorbing portion is arranged so as to be in contact with the outer peripheral wall of the receptacle when the cap is being attached to the receptacle.

2 Claims, 4 Drawing Sheets

RECEPTACLE CAP

CROSS REFERENCE TO RELATED APPLICATIONS

The present application claims priority from Japanese patent application JP 2023-021075 filed on Feb. 14, 2023, the entire content of which is hereby incorporated by reference into this application.

BACKGROUND

Technical Field

The present disclosure relates to a receptacle cap, particularly to a cap configured to be removably attached to a receptacle that connects to a fuel gas filling nozzle.

Background Art

Recently, a vehicle installed with a fuel cell that uses an electrochemical reaction between fuel gas and oxidizing gas to generate power has been developed for practical use. This type of vehicle includes a tank that stores fuel gas, and a receptacle connected to the tank and configured as a fuel gas filling port. When filling the tank with the fuel gas, the vehicle connects the receptacle to a filling nozzle provided on a gas station side to supply the fuel gas on the gas station side to the tank via the filling nozzle and the receptacle.

When filling hydrogen gas, for example, high-pressure hydrogen gas of −40° C. needs to be filled in accordance with filling standards, such as ISO (International Organization for Standardization), SAE (Society of Automotive Engineers), or the like. In this case, since the low-temperature hydrogen cools the receptacle, condensation occurs on the outer peripheral wall of the receptacle when the filling ends. If the cap is attached to the receptacle with such condensation on the receptacle, the condensed water remains and thus causes freezing at the time of subsequent filling when the receptacle is cooled again by the low-temperature hydrogen gas. This freezing may cause fixation of the filling nozzle with the receptacle. Such a fixation issue of the receptacle and the filling nozzle will be serious, particularly in fast filling or at shorter filling intervals, such as in a race or the like.

In response to the above-described issue, various techniques have been proposed.

For example, as described in JP 2018-168890 A, there is a technique of supplying an inert gas to the inside of the cap to avoid occurrence of condensation on the receptacle.

SUMMARY

However, the technique described in JP 2018-168890 A requires a mechanism for supplying an inert gas, which may lead to another issue, such as a more complicated structure.

The present disclosure has been made in view of such a technical issue, and provides a receptacle cap with a simple structure capable of preventing fixation of a receptacle and a filling nozzle.

A receptacle cap according to the present disclosure is a receptacle cap configured to be removably attached to a receptacle that connects to a fuel gas filling nozzle, including: a top panel portion that blocks an opening of the receptacle; a skirt portion extending along an outer peripheral wall of the receptacle; and a liquid absorbing portion provided at least on an inner peripheral wall of the skirt portion. The liquid absorbing portion is arranged so as to be in contact with the outer peripheral wall of the receptacle when the cap is being attached to the receptacle.

In the receptacle cap according to the present disclosure, the liquid absorbing portion provided at least on the inner peripheral wall of the skirt portion is arranged so as to be in contact with the outer peripheral wall of the receptacle when the cap is being attached to the receptacle. Thus, if condensation occurs on the outer peripheral wall of the receptacle by fuel gas filling, or if a liquid such as oil adheres to the outer peripheral wall of the receptacle, these liquids will be absorbed by the liquid absorbing portion by contacting the liquid absorbing portion when the cap is attached to the receptacle. As a result, no liquid remains on the outer peripheral wall of the receptacle at the time of subsequent gas filling. Therefore, it is possible to prevent freezing due to the remaining liquid and prevent fixation of the receptacle and the filling nozzle due to the freezing. In addition, the structure is simpler than that of the conventional one including a mechanism for supplying an inert gas. Further, since the liquid absorbing portion contacts the outer peripheral wall of the receptacle, if foreign matter such as dust adheres to the outer peripheral wall of the receptacle, the foreign matter is removed by the liquid absorbing portion when the cap is detached from the receptacle. As a result, it is possible to prevent the connection between the receptacle and the filling nozzle from being affected by the adhesion of the foreign matter.

In addition, a receptacle cap according to the present disclosure is a receptacle cap configured to be removably attached to a receptacle that connects to a fuel gas filling nozzle, including: a top panel portion that blocks an opening of the receptacle; a skirt portion extending along an outer peripheral wall of the receptacle; and a circumferential projection made of rubber or resin provided on an inner peripheral wall of the skirt portion. The circumferential projection is arranged so as to abut on the outer peripheral wall of the receptacle when the cap is being attached to the receptacle.

In the receptacle cap according to the present disclosure, the circumferential projection made of rubber or resin provided on the inner peripheral wall of the skirt portion is arranged so as to abut on the outer peripheral wall of the receptacle when the cap is being attached to the receptacle. Thus, if condensation occurs on the outer peripheral wall of the receptacle by fuel gas filling, or if a liquid such as oil adheres to the outer peripheral wall of the receptacle, these liquids will be scraped out and removed by the circumferential projection when the cap is detached from the receptacle. As a result, no liquid remains on the outer peripheral wall of the receptacle at the time of subsequent gas filling. Therefore, it is possible to prevent freezing due to the remaining liquid and prevent fixation of the receptacle and the filling nozzle due to the freezing. In addition, the structure is simpler than that of the conventional one including a mechanism for supplying an inert gas. Further, if foreign matter such as dust adheres to the outer peripheral wall of the receptacle, the foreign matter is scraped out and removed by the circumferential projection when the cap is detached from the receptacle. As a result, it is possible to prevent the connection between the receptacle and the filling nozzle from being affected by the adhesion of the foreign matter.

According to the present disclosure, the fixation of a receptacle and a filling nozzle can be avoided with a simple structure.

DETAILED DESCRIPTION

Figure 2:
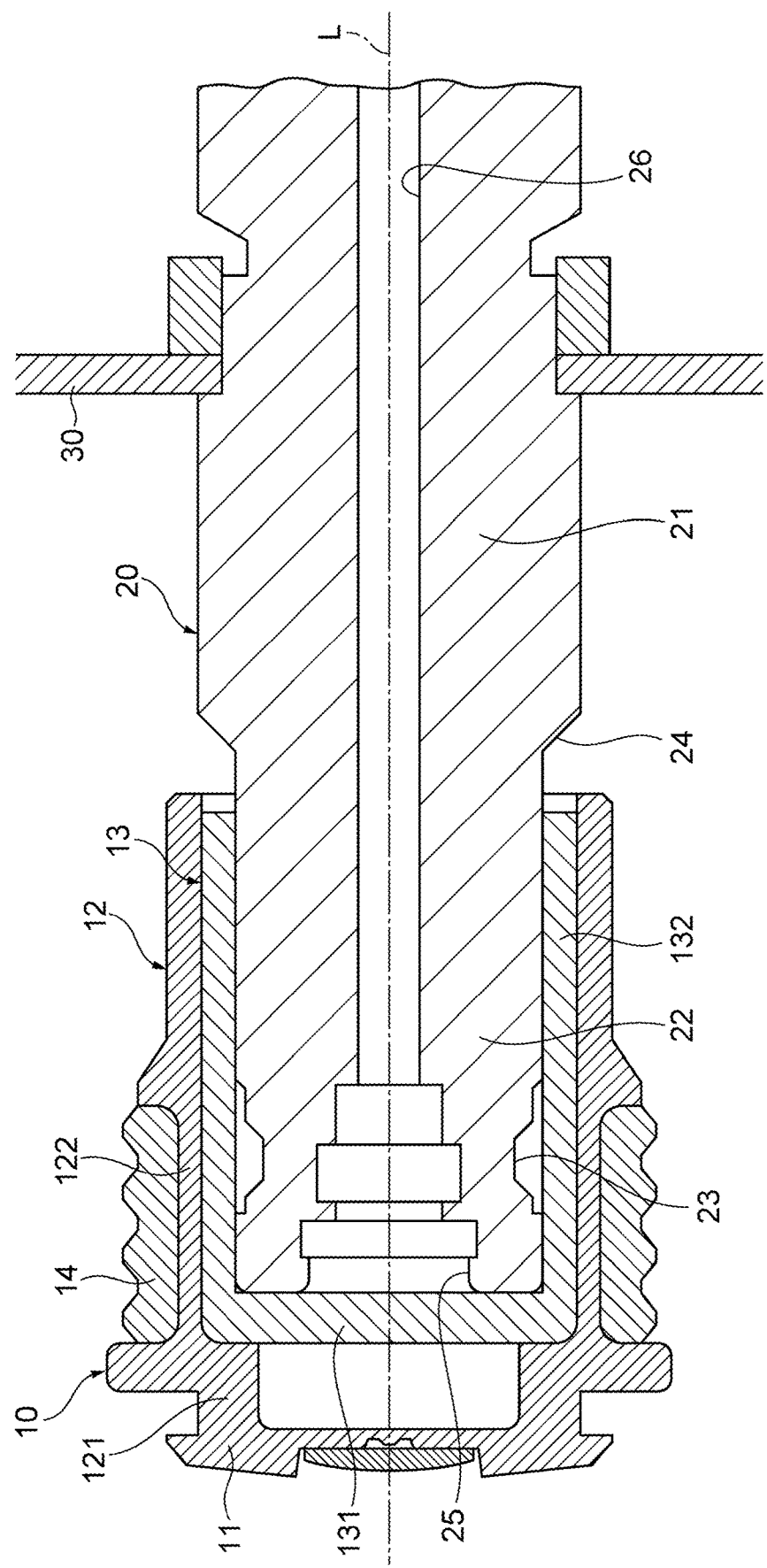
FIG. 2 is a cross-sectional view showing the cap being attached to the receptacle.
Figure 4:
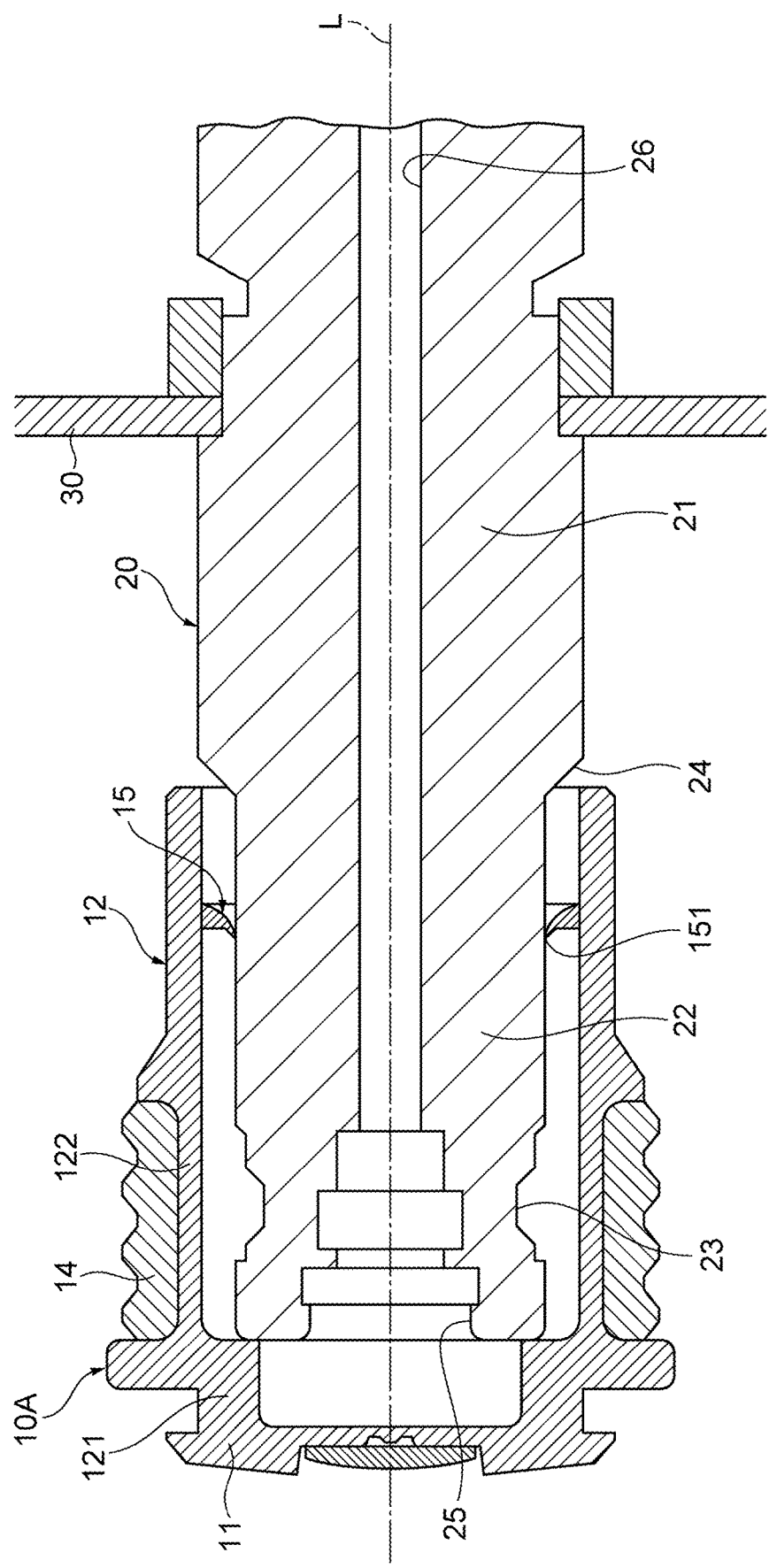
FIG. 4 is a cross-sectional view showing the cap being attached to the receptacle.

An embodiment of a receptacle cap according to the present disclosure will be described below referring to the drawings. In the description of the drawings, the same elements are denoted by the same reference numerals, and repeated description thereof will be omitted. In FIG. 2 and FIG. 4, for easier understanding of the attached state of the cap and the receptacle, not only the cap but also the receptacle is shown by a solid line. However, the cap according to the embodiment does not include the receptacle configuration.

First Embodiment

Figure 1:
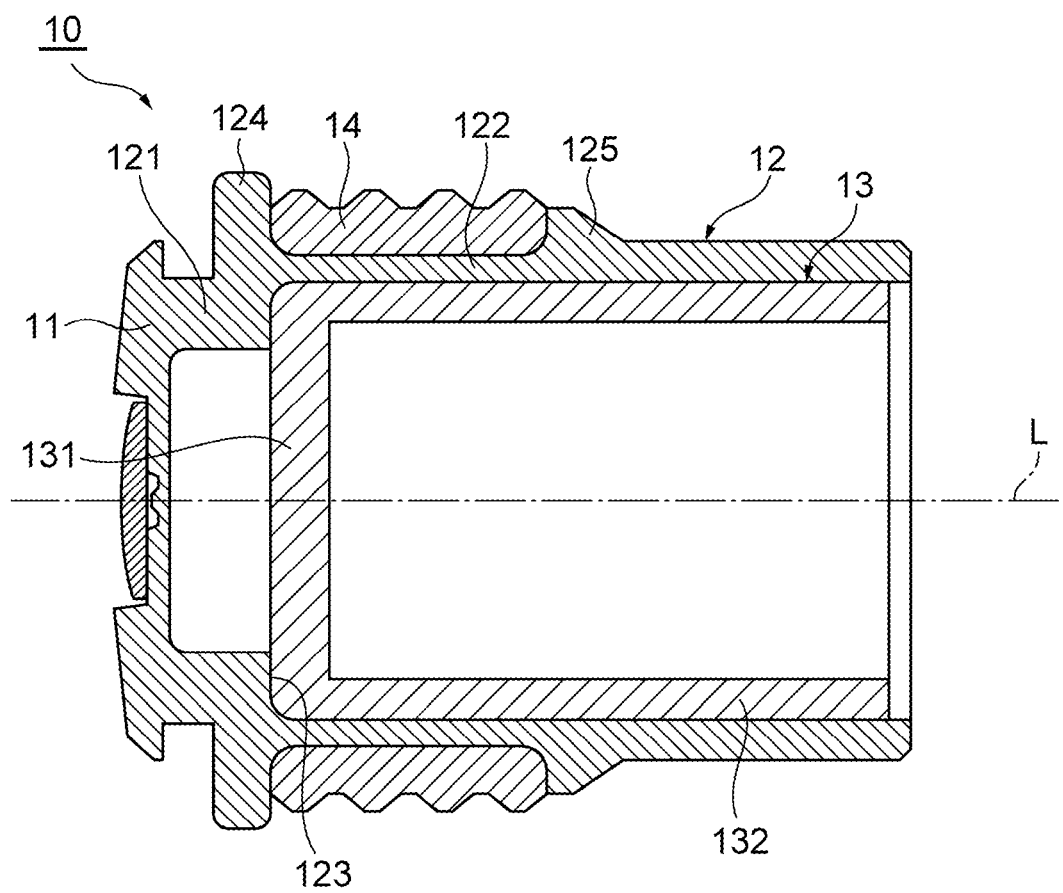
FIG. 1 is a cross-sectional view showing a receptacle cap according to a first embodiment.

FIG. 1 is a cross-sectional view showing a receptacle cap according to a first embodiment, and FIG. 2 is a cross-sectional view showing the cap being attached to the receptacle. A receptacle cap 10 (hereinafter, may be simply referred to as "cap 10") of the present embodiment is applied to, for example, a fuel cell vehicle (not shown) equipped with a fuel gas tank, and is configured to be removably attached to a receptacle 20 configured as a filling port of the fuel gas tank, and has a function of protecting the receptacle 20 and preventing foreign matter such as dust from entering the receptacle 20.

In the present embodiment, hydrogen gas is described by way of example as the fuel gas, but the fuel gas is not limited to hydrogen gas, and may be various gases such as CNG (compressed natural gas), LNG (liquefied natural gas), and LPG (liquefied petroleum gas).

The hydrogen gas is filled into the fuel gas tank of the fuel cell vehicle, for example, from a gas station (not shown). When the hydrogen gas is filled, the receptacle 20 with the cap 10 detached is connected to a filling nozzle provided on the gas station side, and the high-pressure hydrogen gas on the gas station side is supplied to the fuel gas tank through the filling nozzle and the receptacle 20.

As shown in FIG. 2, the receptacle 20 is formed in a substantially cylindrical shape by a metallic material such as stainless-steel, for example, and is fixed to the vehicle body via a panel member 30. More specifically, the receptacle 20 has a large-diameter portion 21 fixed to the panel member 30 and having a relatively large outside diameter, and a small-diameter portion 22 protruding outward from the vehicle body and having a relatively small outside diameter than the large-diameter portion 21. The large-diameter portion 21 and the small-diameter portion 22 are integrally formed.

An engaging peripheral groove 23 is formed on the outer peripheral wall of the small-diameter portion 22 on the distal side to engage with a locking ball provided in the filling nozzle. A tapered step surface 24 is formed between the small-diameter portion 22 and the large-diameter portion 21. This step surface 24 abuts on the open end of the cap 10 and restricts the insertion depth of the cap 10 when the cap 10 is attached to the receptacle 20.

An open end of the small-diameter portion 22 forms an opening 25 of the receptacle 20. The opening 25 is shaped to receive the tip portion of the filling nozzle. In addition, a communication path 26 extending along the axis L direction of the receptacle 20 is formed inside the small-diameter portion 22 and the large-diameter portion 21. The communication path 26 communicates the opening 25 with the inside of the fuel gas tank.

On the other hand, the cap 10 is formed in a closed top cylindrical shape so as to have a space for accommodating the small-diameter portion 22 of the receptacle 20. The cap 10 includes a top panel portion 11 that blocks the opening 25 of the receptacle 20 and a skirt portion 12 that extends along the outer peripheral wall of the receptacle 20. The top panel portion 11 and the skirt portion 12 are integrally formed of, for example, a metallic material or a hard resin material.

The top panel portion 11 is formed in a substantially disk shape, for example, and is disposed so as to face the opening 25 of the receptacle 20 in the axis L direction of the receptacle 20.

The skirt portion 12 is formed in a cylindrical shape so as to surround the small-diameter portion 22 of the receptacle 20, and extends along the axis L direction of the receptacle 20. Specifically, the skirt portion 12 has a small-diameter skirt 121 coupled to the top panel portion 11 and having a relatively small inside diameter and a large-diameter skirt 122 coupled to the small-diameter skirt 121 and having a relatively large inside diameter. A step 123 is formed between the small-diameter skirt 121 and the large-diameter skirt 122.

Further, a reinforcing ring 14 for reinforcing the skirt portion 12 is provided on the outer side of the large-diameter skirt 122. The reinforcing ring 14 is formed of, for example, a hard resin material or a metallic material and is arranged between two projections 124, 125 spaced apart on the outer peripheral wall of the large-diameter skirt 122. The reinforcing ring 14 is in close contact with the large-diameter skirt 122 so as to surround the large-diameter skirt 122. Further, in order to prevent slippage when the cap 10 is taken, the outer surface of the reinforcing ring 14 is formed in an uneven shape.

In addition, a liquid absorbing portion 13 for absorbing a liquid is provided inside the cap 10. The liquid absorbing portion 13 has a closed top cylindrical shape, and has a top plate portion 131 provided opposite to the top panel portion 11 and a peripheral wall 132 provided on the inner peripheral wall of the skirt portion 12. The top plate portion 131 and the peripheral wall 132 are integrated.

The top plate portion 131 is formed in, for example, a disk shape, and is arranged so as to be in contact with the distal end surface of the receptacle 20 (more specifically, the distal end surface of the small-diameter portion 22) when the cap 10 is being attached to the receptacle 20. The peripheral wall 132 is formed, for example, in a cylindrical shape, and is arranged so as to be in contact with the outer peripheral wall of the receptacle 20 (more specifically, the outer peripheral wall of the small-diameter portion 22) when the cap 10 is being attached to the receptacle 20. The liquid absorbing portion 13 configured as described above is fixed to the inside of the skirt portion 12 by bonding the peripheral wall 132 to the inner peripheral wall of the large-diameter skirt 122 with an adhesive or the like while the top plate portion 131 abuts on the step 123.

The material of the liquid absorbing portion 13 is not particularly limited as long as it absorbs liquids such as water and oil. For example, the material of the liquid absorbing portion 13 may be a superabsorbent material (e.g., Super Absorbent Polymer (SAP) used in diapers that does not allow the absorbed liquid to escape out. When the superabsorbent polymer is granular, the granular superabsorbent polymer is wrapped with a sheet-like material having liquid permeability and formed into a closed top cylindrical shape, and the formed superabsorbent polymer is bonded to the inner peripheral wall of the large-diameter skirt 122 with an adhesive or the like to form the liquid absorbing portion 13. It should be noted that the sheet-like material having liquid permeability may be a material that does not produce fibrous material.

As a material of the liquid absorbing portion 13, a resin material such as a nylon-based resin or polypropylene having a water absorbing property can be used. Here, the liquid absorbing portion 13 is formed by directly processing these resin materials into the shape of the liquid absorbing portion 13 (e.g., the above-described closed top cylindrical shape) and bonding the processed resin material to the inner peripheral wall of the large-diameter skirt 122 with an adhesive or the like.

In addition, a plastic foam may be used as the material of the liquid absorbing portion 13. As the plastic foam, for example, a thermoplastic resin foam made of an olefin-based resin such as polyethylene or polypropylene, or a polyurethane foam can be used. Here, the liquid absorbing portion 13 is formed by directly processing these plastic foams into the shape of the liquid absorbing portion 13 (e.g., the above-described closed top cylindrical shape) and bonding the processed plastic foam to the inner peripheral wall of the large-diameter skirt 122 with an adhesive or the like.

As shown in FIG. 2, while the cap 10 is being attached to the receptacle 20, the top plate portion 131 of the liquid absorbing portion 13 comes into contact with the distal end surface of the receptacle 20 (more specifically, the distal end surface of the small-diameter portion 22), and the peripheral wall 132 comes into contact with the outer peripheral wall of the receptacle 20 (more specifically, the outer peripheral wall of the small-diameter portion 22). Therefore, if condensation occurs on the distal end surface of the receptacle 20 and/or on the outer peripheral wall of the receptacle 20 by fuel gas filling, or if a liquid such as oil adheres to the distal end surface of the receptacle 20 and/or the outer peripheral wall of the receptacle 20, these liquids will be absorbed by the liquid absorbing portion 13 by contacting the liquid absorbing portion 13 when the cap 10 is attached to the receptacle 20. As a result, no liquid remains on the receptacle 20 at the time of subsequent gas filling. Therefore, it is possible to prevent freezing due to the remaining liquid and prevent fixation of the receptacle 20 and the filling nozzle due to the freezing.

In addition, the structure is simpler than that of the conventional one including a mechanism for supplying an inert gas. Further, since the peripheral wall 132 of the liquid absorbing portion 13 contacts the outer peripheral wall of the receptacle 20 (more specifically, the outer peripheral wall the small-diameter portion 22), if foreign matter such as dust adheres to the outer peripheral wall of the small-diameter portion 22, the foreign matter is removed by the peripheral wall 132 when the cap 10 is detached from the receptacle 20. Therefore, it is possible to prevent the connection between the receptacle 20 and the filling nozzle from being affected by the adhesion of the foreign matter.

In the present embodiment, the liquid absorbing portion 13 having the top plate portion 131 and the peripheral wall 132 are described by way of example, but the liquid absorbing portion 13 may not have the top plate portion 131. That is, a portion where condensation occurs most frequently is the outer peripheral wall of the small-diameter portion 22, and it is sufficient to have the peripheral wall 132 corresponding to this portion.

Second Embodiment

A second embodiment of a receptacle cap will be described below referring to FIG. 3 and FIG. 4. A cap 10A of the present embodiment is different from the first embodiment described above in that a circumferential projection 15 is provided on the inner peripheral wall of the skirt portion 12 without the liquid absorbing portion 13. The other structures are the same as those of the first embodiment, and thus repeated descriptions will be omitted.

Figure 3:
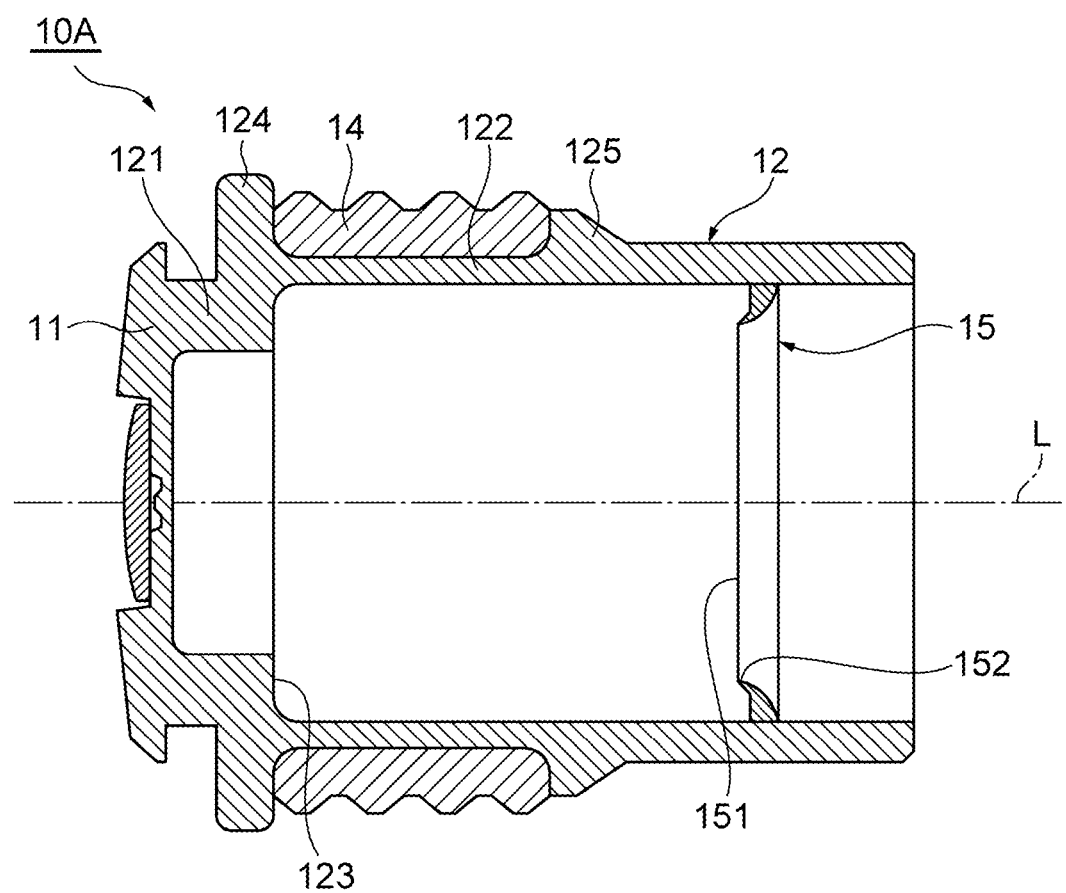
FIG. 3 is a cross-sectional view showing a receptacle cap according to a second embodiment.

FIG. 3 is a cross-sectional view showing a receptacle cap according to the second embodiment, and FIG. 4 is a cross-sectional view showing the cap being attached to the receptacle. As shown in FIG. 3, the cap 10A further includes the circumferential projection 15 provided on the inner peripheral wall of the skirt portion 12, in addition to the top panel portion 11, the skirt portion 12, and the reinforcing ring 14. The circumferential projection 15 is made of rubber or resin, is formed in an annular shape so as to have a through hole 152 in the center, and protrudes from the inner peripheral wall of the large-diameter skirt 122 toward the axis L of the receptacle 20. The circumferential projection 15 is arranged so as to abut on the outer peripheral wall of the receptacle 20 when the cap 10A is being attached to the receptacle 20.

More specifically, the circumferential projection 15 is tapered such that its width gradually narrows from the outer side to the inner side of the cap 10A. The tapered tip portion 151 is curved toward the top panel portion 11. Then, when the cap 10A is being attached to the receptacle 20, the inside diameter of the circumferential projection 15 (in other words, the diameter of the through hole 152) is slightly smaller than the outside diameter of the small-diameter portion 22 so that the tip portion 151 can abut on the outer peripheral wall of the small-diameter portion 22 of the receptacle 20.

The cap 10A includes one circumferential projection 15, and the circumferential projection 15 is located close to the open end of the large-diameter skirt 122 of the skirt portion 12 (i.e., the end away from the small-diameter skirt 121). This is because, when the circumferential projection 15 is used to scrape out and remove the liquid or foreign matter adhering to the outer peripheral wall of the small-diameter portion 22 of the receptacle 20, the longer the contact distance with the small-diameter portion 22 is, the more effective the liquid or foreign matter can be removed.

Examples of the rubber material used for the circumferential projection 15 include flexible silicone rubber, fluororubber, and ethylene propylene diene rubber (EPDM). On the other hand, examples of the resin material used for the circumferential projection 15 include an epoxy resin and a vinyl chloride resin having flexibility. The circumferential projection 15 is fixed to the inner peripheral wall of the large-diameter skirt 122 with, for example, an adhesive.

In the cap 10A for the receptacle according to the present embodiment, the rubber-made or resin-made circumferential projection 15 provided on the inner peripheral wall of the skirt portion 12 is arranged so as to abut on the outer peripheral wall of the receptacle 20 while the cap 10A is being attached to the receptacle 20. Therefore, when condensation occurs on the outer peripheral wall of the receptacle 20 (more specifically, the outer peripheral wall of the small-diameter portion 22) by fuel gas filling, or when a liquid such as oil adheres to the outer peripheral wall of the receptacle 20 (more specifically, the outer peripheral wall of the small-diameter portion 22), these liquids will be scraped out and removed by the circumferential projection 15 when the cap 10A is detached from the receptacle 20. As a result, no liquid remains on the outer peripheral wall of the receptacle 20 at the time of subsequent gas filling. Therefore, it is possible to prevent freezing due to the remaining liquid and prevent fixation of the receptacle 20 and the filling nozzle due to the freezing.

In addition, the structure is simpler than that of the conventional one including a mechanism for supplying an inert gas. Further, if foreign matter such as dust adheres to the outer peripheral wall of the receptacle 20 (more specifically, the outer peripheral wall of the small-diameter portion 22), the foreign matter is scraped out and removed by the circumferential projection 15 when the cap 10A is detached from the receptacle 20. Therefore, it is possible to prevent the connection between the receptacle 20 and the filling nozzle from being affected by the adhesion of the foreign matter.

Further, the circumferential projection 15 is formed of a flexible rubber material or resin material, and can be deformed while following the uneven shape of the outer peripheral wall of the small-diameter portion 22 of the receptacle 20, so that it is possible to suitably scrape out the liquid and foreign matter adhering to the outer peripheral wall of the small-diameter portion 22.

In the present embodiment, as illustrated in FIG. 3 and FIG. 4, providing one circumferential projection 15 is described by way of example, but a plurality of the circumferential projections 15 may be provided. For example, on the inner peripheral wall of the skirt portion 12, a plurality of circumferential projections 15 may be provided at predetermined intervals (for example, equal intervals) along the extending direction (in other words, the axis L direction of the receptacle 20) of the skirt portion 12. In this manner, the liquid and the foreign matter adhering to the outer peripheral wall of the receptacle 20 can be scraped out without being left.

Although the embodiments of the present disclosure have been described in detail above, the present disclosure is not limited to the above-described embodiments, and various design changes can be made without departing from the spirit of the present disclosure described in the claims.

What is claimed is:
1. A filling port structure comprising:
    a receptacle configured as a filling port of a fuel gas tank; and
    a cap removably attached to the receptacle, the cap comprising:
        a top panel portion that blocks an opening of the receptacle;
        a skirt portion extending along an outer peripheral wall of the receptacle; and
        a circumferential projection made of rubber or resin provided on an inner peripheral wall of the skirt portion,
    wherein
    the circumferential projection is arranged so as to abut on the outer peripheral wall of the receptacle when the cap is being attached to the receptacle,
    the skirt portion includes a small-diameter skirt portion coupled to the top panel portion and having a relatively small inside diameter and a large-diameter skirt portion coupled to the small-diameter skirt portion and having a relatively large inside diameter,
    the large-diameter skirt portion includes an open end away from the small-diameter skirt portion, and
    the circumferential projection is located close to the open end of the large-diameter skirt portion.
2. The filling port structure according to claim 1, wherein the circumferential projection is tapered such that its width gradually narrows from an outer side to an inner side of the cap, the tapered tip portion being curved toward the top panel portion.

\* \* \* \* \*